Nov. 29, 1927.
J. B. HENDERSON
1,651,025
OPTICAL INSTRUMENT
Filed March 27, 1924
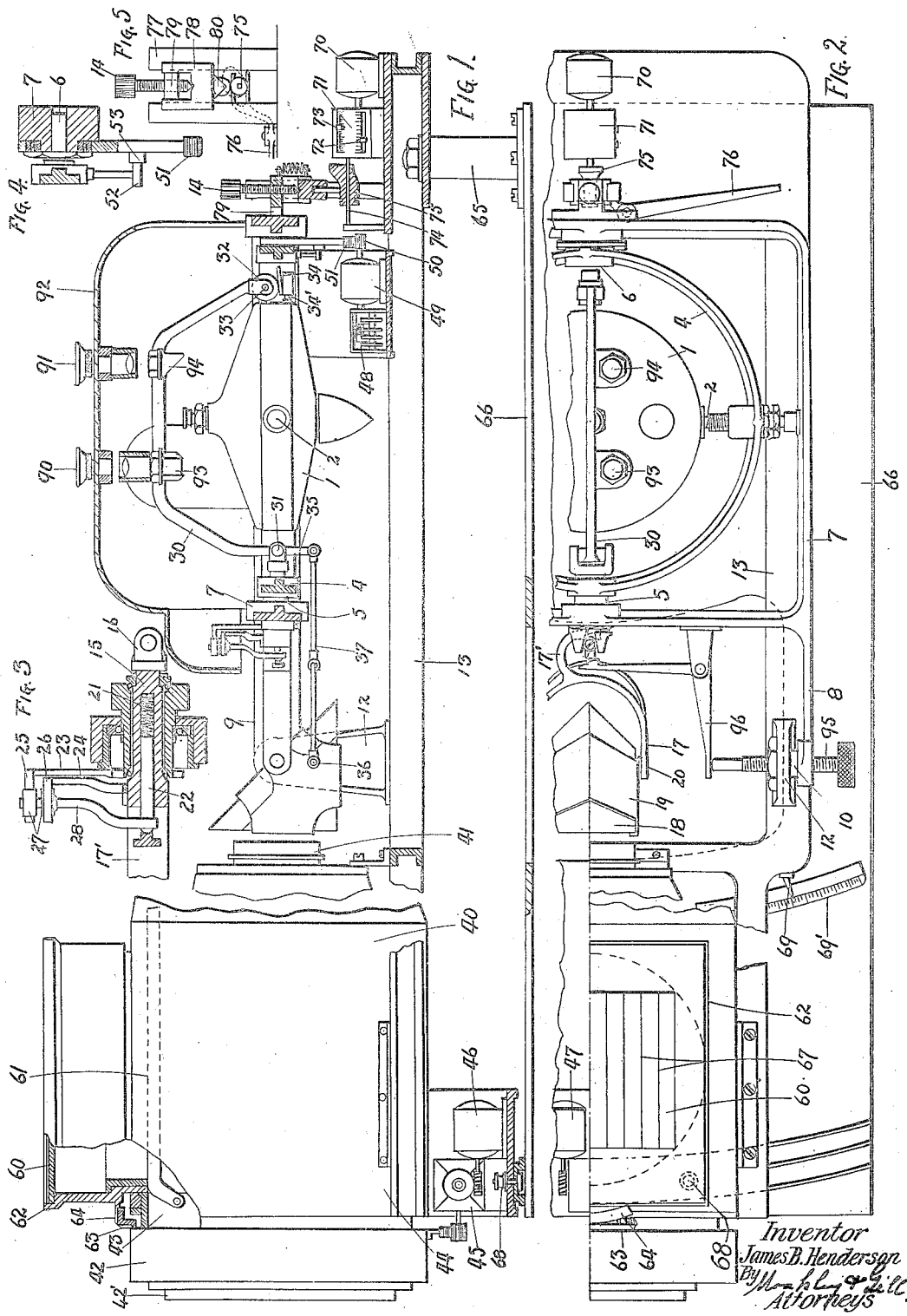
Inventor
James B. Henderson
By Mayhly & Gill
Attorneys Patented Nov. 29, 1927.

1,651,025

UNITED STATES PATENT OFFICE.

JAMES BLACKLOCK HENDERSON, OF BLACKHEATH, ENGLAND.

OPTICAL INSTRUMENT.

Application filed March 27, 1924, Serial No. 702,250, and in Great Britain April 17, 1923.

My invention relates to improvements in optical instruments such as cameras, telescopes or the like for use on aircraft or other moving bodies for observing or photographing terrestrial or elevated targets. It relates more particularly to the elimination of the apparent movement of the image of the target in the focal plane due to relative rectilinear movement between the instrument and the target. The invention is applicable to many different types of optical instruments but is hereinafter described in application to a photographic camera mounted on an aeroplane.

In aerial photography the principal difficulties encountered, omitting those due to low visibility and other atmospheric conditions, arise from various movements between the camera and the target during the exposure. These movements may be angular due to banking, pitching or yawing of the aeroplane, or may be rectilinear due to the substantially rectilinear movements of the aeroplane in its forward flight or lateral drift down-wind.

Taking it as axiomatic that a clear photograph has hitherto depended on preventing apparent movement of the image on the plate during exposure exceeding, say, 2 minutes of arc measured from the lens, then if the speed of the aeroplane be 100 feet per second at an altitude of 5000 feet above the target, the rate of movement of the image will be 68 minutes of arc per second of time, the maximum possible exposure being therefore 1/34th of a second. Other factors, however, such as rotation of the image due to yawing of the aeroplane may produce much more rapid displacement of the image, imposing still greater limits to the possible duration of the exposure.

Practical remedies for the effects of these movements have in the past been confined to a shortening of the exposure, an increase of the photographic speed of the plates used, and an increase of the diameter of lenses. None of these remedies are completely successful. Between-lens shutters are inferior to focal-plane shutters for giving very short exposures, but the latter tend to produce distorted photographs which lose much of their value for survey purposes. Large lenses, on the other hand, are difficult to make with accuracy and are very expensive.

I approach the problem from another direction and instead of decreasing the exposure to suit the movements of the image, I eliminate the apparent movement of the image for a period sufficient to permit of the length of exposure which atmospheric and other conditions demand. I produce in the focal plane of the camera an image of the target and I stabilize both the image and the photographic plate in that plane long enough to secure a good photograph.

To produce this stabilized image it is necessary to eliminate or compensate the effects of all relative movements between the camera and target, both angular and rectilinear. In my co-pending application Serial No. 674,871, filed November 15, 1923, I have described how I compensate angular movements of the aeroplane to which the camera is attached and the present invention relates to a method of compensating for rectilinear movements so that compensation will be complete. It also includes the application of the measurement of the compensation to determine:—

(a) the groundspeed of the aeroplane at a known altitude, or (b) the altitude, when the groundspeed is known.

An embodiment of my invention is shown in the attached drawings in which,

Fig. 1 is an elevation of a photographic camera and the mechanism used to produce a stabilized image.

Fig. 2. is a half plan of Fig. 1.

Figs. 3, 4, and 5 show details not clearly shown in Fig. 1.

In Figs. 1 and 2 I have included the mechanism shown in connection with my co-pending application Serial No. 674,871, filed November 15, 1923, as a comprehension of the present invention entails a description of the former.

In Figs. 1 and 2, 1 is a gyroscope in its casing with an approximately vertical rotor axis, pivoted on trunnions 2 in a gimbal ring 4 which in turn is pivoted on trunnions 5 and 6 in two opposite sides of a square frame 7 the trunnions 5 being hollow. The other two sides of the frame 7 are prolonged in arms 8 and 9 which carry horizontal trunnions 10 supported in bearings in two pillars 12 an a main frame 13. The frame 7 is supported at its other end by the frame 13 on an adjustable support 14 which will be described more fully later.

In ball bearings in the hollow trunnion 5 is a spindle 15, (also see Fig. 3) which carries at one end inside the gimbal ring 4 a small horizontal fork 16 and at its other end outside the frame 7 a larger horizontal fork 17 at the end of a U-shaped neck 17'-shown more clearly in Fig. 2. The fork 17 carries a prism 18 in its frame 19 on pivots 20 which are collinear with the trunnion axis 10—11. The prism is a right angle prism with a roof prism on its hypotenuse, the two pentagonal faces being vertical and horizontal and the roof-edge uppermost and towards the gyroscope. In the outer end of the spindle 15 is drilled an axial hole in which are housed a helical spring 21 and a pin 22 which is a good sliding fit in the hole. Arms 23 and 24 attached to the trunnion 5 and spindle 15 respectively carry projections 25 and 26 which have machined faces oppositely inclined to the vertical plane of the trunnion axis 5—6. Between these faces is a double roller 27 pivoted on a vertical pillar 28 mounted on the outer end of the pin 22. The rollers 27 thus act as a key between the trunnion 5 and the spindle 15, that is to say between the gimbal ring 4 and the prism 18 as regards movement round the trunnion axis 5—6. In other words the prism 18 will be stabilized by the gyroscope about the axis 5—6. The two arms 23 and 24 are kept pressed against the rollers 27 by a spring, which has been omitted for the sake of clearness.

In the small fork 16 a bent arm 30 is pivoted on an axis pin 31, the arm spanning the gyroscope in the vertical plane of the trunnion axis 5—6 and terminating in a small fork which supports a roller 32 on an axis 33, the roller resting on a small inclined platform 34 carried by the gyroscope. The platform 34 is pivoted on the gyroscope casing on a small trunnion 34' and is inclined to the plane of rotation of the gyro at the same angle as a line joining the centre of suspension of the gyroscope to the axis of the roller. The pivot axes 31 and 33 are equidistant from the gyro trunnion axis 2 with the result that if the frame 7 tilts around the gyroscope about that axis, the arm 30 will move angularly about the pivot 31 relatively to the frame through half the angle of angular movement of the frame. The arm 30 is continued below the fork 16 in a short arm 35 which is connected to a pair of eccentric trunnions 36 on the prism frame 19 by a link and fork 37 parallel to the spindle 15, the arm 35 being equal and parallel to the distance of the trunnion axis 36 from the prism axis 20. Angular movement of the arms 30 and 35 round the pivot 31 will therefore be communicated in equal amount and direction to the prism 18. That is to say, the prism 18 will be semi-stabilized about the axis 20.

The camera 40 is rigidly attached to the main frame 13 with its lens 41 facing into the vertical face of the prism and the entire apparatus is arranged on the aeroplane so that the lower face of the prism has a clear view of the earth beneath.

In my co-pending application Serial No. 674,871, filed November 15, 1923, I describe how the above mechanism forms in the focal plane of the camera a stabilized image of the ground vertically beneath the prism, irrespective of pitching and rolling of the aeroplane, but rotates the image on the plate through the angle of bank or yaw of the aeroplane. To counteract the latter movements I pivot the back of the camera which carries the focal plane shutter 42 and plate holder 42' on the camera body by a cylindrical cell 43 on the shutter fitting in a circular bearing in the back of the body 44, the pivot axis being the line of collimation of the lens. I control the pivoted back about this axis by a differential gear 45 which is actuated by either of the repeater motors 46 and 47. The motor 46 is connected by wiring (not shown) to a transmitter 48 on the spindle of a small D. C. follow-up motor 49, the toothed pinion 50 of which gears with a toothed sector 51 pivoted on a boss on the frame 7 (see Fig. 4.) concentrically with the trunnion 6. The D. C. motor is actuated (through wiring not shown) by a roller contact 52 on the gimbal ring and a 2-part commutator 53 on the sector 51, so that the motor will move the sector through the angle of roll of the aeroplane, a similar displacement being simultaneously imparted to the transmitter 48 and through it to the repeater motor 46, differential gear 45 and shutter 42. The incidental gearing is selected to give to the shutter an angular displacement equal and opposite to the roll of the aeroplane. As the aeroplane rolls, therefore, moving the camera angularly in relation to the stabilized image, the action of the follow-up motor and repeater motor keeps the shutter and plate stationary so that there is no relative movement between the plate and the image. Similarly in the case of the rotation of the image on the plate produced by yawing, I compensate this by actuating the other repeater motor 47 in an exactly similar way from a gyro-compass or other azimuth indicator (not shown) carried by the aeroplane.

By the above means the compensation or elimination of all angular movements of the aeroplane is complete, and it only remains to counteract the effects of the rectilinear movement of the aeroplane in flight.

As the time between exposure in a continuous survey is very short I employ a two-lens camera, or a reflex camera as shown, the ground glass view-finder 60 being situated in the roof of the camera and the image reflected onto it by a mirror 61 pivoted inside the camera body and capable of being raised out of the way into the position shown when making an exposure or dropped into a position inclined at 45° to the line of collimation when using the view-finder. I pivot the view-finder cell 62 on a ring attached to the top of the camera and key it to the rotating shutter by the bevel gears 63, 64, so that both move through the same angle.

I first of all eliminate the effect of lateral drift of the aeroplane by pivoting the whole apparatus so far described on a vertical pillar 65 on a bed-plate 66 rigidly attached to the aeroplane and move it round that pivot until the image in the view-finder is seen to be moving vertically down the view-finder, lines such as 67 being marked on the ground glass for the purpose. The camera is then clamped by means of the jam-nut 68 or some similar device. A pointer 69 on the camera or its frame and a scale of degrees 69' on the base plate, situated in any convenient place will give the deviation of the course from the compass heading of the aeroplane. This reading gives, in conjunction with the compass reading, the direction of the ground speed.

As explained above the prism 18 is controlled about its trunnion axis 20 by the gyroscope through the lever 30, arm 35 and link 37 so as to be moved through half the angle of movement of the aeroplane or frame 7 round the gyro trunnion axis 2. By introducing a movement of the frame 7 relatively to the camera I can therefore produce a movement of the prism about its axis 20 which will cause a movement of the image vertically on the plate. I therefore arrange for such a movement equal to the apparent movement of the image, and in the opposite direction, so that for a short time the image will be stationary, the exposure being made during one of such periods. This movement I introduce by a D. C. motor 70, running at constant speed driving a variable speed gear 71, the slider of which has a compound control by two setting levers 72 and 73, one of which I set at the start for altitude and the other I adjust for ground speed. The driven shaft 74 of the variable speed gear has a square end on which is slidably mounted a sleeve 75, which at one end is a cylinder and the other end a cam, the two curves being blended into each other along the length of the sleeve 75. The sleeve can be slid along the square end 74 by a forked lever 76 pivoted on the main frame 13. Two pillars 77 (see also Fig. 5) on the frame 13 form guides for a slide 78 on which a lug 79 on the outer frame 7 of the gyro is adjustably supported by the screw 14, the slide 78 being provided on its lower face with a roller 80 which rests on one or the other curve of the sleeve 75 according to the position of the lever 76. When the roller 80 rests on the cylindrical end of the sleeve 75 there will be no movement of the frame 7 relatively to the aeroplane and the image will have its usual steady downward movement on the plate, but if the cam end is slid beneath the roller 80 the frame 7 will be oscillated about the trunnion axis 10 and the prism will similarly be oscillated about its trunnion axis 20 but through half the angle. In that case as the frame 7 is tilted up the movement of the image on the view-finder will be accelerated but as it is lowered the movement of the image will be retarded, annulled or reversed according as the reverse movement due to the tilting of the prism is less than, equal to or greater than movement due to ground speed. If the variable speed gear has the setting lever 72 properly set to the altitude on commencing a flight and the camera correctly oriented for direction of ground speed as described above, the setting of the lever 73 which is observed to produce periods of immobility of the image in the view finder will therefore indicate the velocity of the ground speed. I arrange the cam on the sleeve 75 to give a rapid lift to the frame 7 and a comparatively slow regular fall, producing a quick downward jump of the image on the view-finder followed by a longer period of rest, so as to give a maximum time for the observer to select his target, check the various settings and make the exposures. From time to time he will have to move the lever 76 to bring the cylindrical end of the sleeve 75 under the roller 80 in order to check the verticality of the prism 18. This is effected by two small telescopes 90 and 91 on the cover 92 of the instrument by which the horizon in two perpendicular directions can be viewed in the two prisms 93, 94 carried by the lever 30. If the gyro strays from the vertical the image seen in the view-finder 60 will be no longer that of the ground vertically beneath and to compensate for this I adjust the prism 18 about both its pivot axes. The adjustment about its trunnion axis 20 is effected by the screw adjustment 14 by which the frame 7 rests on the slide 78 (Fig. 5) and about the trunnion axis 5—6 the prism in its fork 17 is adjustable, as shown in Fig. 2, by a screw 95 passing through the trunnion 10 of the frame 7 and bearing against the tail of the bell-crank 96 the head of which bears against the end of the pin 22, contact being maintained by the spring 21 (Fig. 3). By turning the screw 95 the pin 22 can be moved in or out of its housing, producing movement of the rollers 27 in the V made by the faces 25 and 26, and so adjusting the prism 18 angularly round the axis 5—6. If the gyro 1 and gimbal ring 3, stray from the horizontal plane, these two adjustments enable the observer by viewing the horizon in the telescopes 90 and 91 to adjust the prism 18 relatively to the gyro so as to obviate straying of the line of sight from the vertical. But when making these adjustments the roller 80 must rest on the cylindrical end of the sleeve 75 so as to have no motion of the frame 7 in which the aeroplane and telescopes 90 and 91 do not participate.

These observations do not in any way interfere with the work of taking photographs, while the complete stabilization of the image on the plate enables exposures to be prolonged so that telephotographic or wideangle lenses may be used, or exposure made in weather conditions in which otherwise photographs could not be taken at all.

In Fig. 1, I show a D. C. motor 70, running at constant speed, the variation for ground speed being introduced into the variable speed gear compounded with the altitude. Alternatively I may use a variable speed motor and have only one control of the variable speed gear. For instance I may drive the motor proportionally to the altitude and set the reduction gear for ground speed, or vice versa. In another form I may even drive the variable speed gear from the aeroplane engine or by clockwork or by an air-screw, but the last form would not be reliable as it would have a velocity proportional to the airspeed, not the groundspeed. In all forms the equation of the movement given to the prism is the same viz, $\frac{v}{V} = \frac{f}{h}$ in which $v$ is the movement given to the image on the plate by the tilt of the prism, V the groundspeed, $f$ the focal length of a camera lens and $h$ the altitude, so that the displacement of the image, $v = f\frac{V}{h}$ in which $f$ is a constant for a given lens. Where cameras with different lenses have to be used for different purposes, I either provide different cams for the variable speed gear, or else introduce an $f$ factor into the control of the motor or variable speed gear. Interchangeable cams would, however be the simpler method. A number of different cams could be arranged along the sleeve 75 if desired, any of which could be brought into use by the lever 76.

I may release the camera shutter by a Bowden wire or trigger worked by the downward travel of the frame 7 so that the exposure could be accurately timed by the mechanism itself and so avoid the jump occurring before the exposure was complete.

The trigger could be made so as to be generally out of action and then brought into play when an exposure is required. I do not illustrate this feature as it can be done in so many obvious ways.

One of the main drawbacks of aerial photography in the past for survey purposes has been the impossibility of plotting contours. With the apparatus described above however all photographs will be truly vertical as regards the central point and two consecutive photographs taken with an overlap will have equally oblique views of the overlapping portion. If therefore in surveying a given strip of country consecutive photographs are made to have half overlaps and the overlaps of each pair of photographs are then viewed stereoscopically, it would be possible to plot in contours with sufficient accuracy.

It will of course be understood that the scope of my invention is not limited to aircraft cameras, but includes any optical instrument from which it is desirable to eliminate the effects of relative movement between the instrument and the object in view. Also although I describe the case where the instrument is in action over a relatively stationary terrestrial object, the conditions might be reversed without impairing the utility of the instrument. In some cases both the instrument and object might be in motion or one might be moving angularly while the other moves in the straight line. For example a camera as described, mounted on a ship rolling at anchor could, by a simple inversion of the prism 18, be used to photograph an aeroplane flying overhead, eliminating the effects of the ship's rolling and of the aeroplane's movement through the air.

Having now ascertained and particularly described my said invention, and in what manner the same is to be performed I claim:—

1. In an optical apparatus mounted on a rectilinearly moving body, the combination of an optical part associated therewith, and variable speed mechanism for moving said part in the plane of and proportional to said rectilinear movement, whereby the field of view in the focal plane of said apparatus is immobilized.

2. The combination of an optical instrument for use on a rectilinearly and angularly moving body, gyroscopic means connected to an optical part of said instruments to nullify the angular movement of the image in the focal plane, and means connected to said optical part to nullify the rectilinear movement of the image in the focal plane of the instrument.

3. An optical apparatus for use on a variably moving body having relatively movable optical parts, a gyroscope for stabilizing said parts against angular movement, and variable speed mechanism for moving said parts to immobilize the field of view against rectilinear movement.

4. The combination of an optical instrument for use on a rectilinearly and angularly moving body, means to annul the effect on the image of such movement, said means comprising an optical part for said instrument, a gyroscope for stabilizing said part against angular movement, and mechanism for moving said part in the plane of said rectilinear movement to render the image stationary against rectilinear movement.

5. The combination with an optical apparatus for use on a moving body, an optical member associated with said apparatus, a gyroscope for stabilizing said member against angular movement relative to the field of view, means controlled by said gyroscope to annul rotary movement in the focal plane of the apparatus, and variable speed means connected to said member to eliminate rectilinear movement in the field of view of the apparatus.

6. An optical apparatus provided with external means to eliminate relative movement between the apparatus and the field of view, said means comprising a gyroscope, an optical member stabilized by the gyroscope, variable speed mechanism for actuating said member and said gyroscope to annul rectilinear movement in the field of view, and means operated by said gyroscope for eliminating relative rotary movement in the focal plane of the apparatus.

7. An optical apparatus for use on a rectilinearly moving body, variable speed means for moving an optical member substantially in the plane of the rectilinear movement to render the field of view stationary, gyroscopic means for stabilizing the field of view, and means for adjusting the position of said apparatus to be substantially parallel to the plane of the rectilinear movement of the body.

8. An optical apparatus for use on a rectilinearly moving body, an external optical part associated with said apparatus, a gyroscope for stabilizing said part and mounted therewith, and variable speed means for moving said reflector and said gyroscope substantially in the plane of said rectilinear motion at a rate varying according to a function of the movement of the body.

9. In an optical instrument for use on a variably moving body, a gyroscope for stabilizing the image against angular movement, a variable speed mechanism for immobilizing the image against rectilinear movement, and means for compensating for the drift of the body.

10. An optical apparatus for use on a rectilinearly moving body, a reflector associated with said apparatus, variable speed mechanism for moving said reflector in the plane of said rectilinear movement so as to immobilize the image in the focal plane of said apparatus, and means associated with said mechanism for measuring the speed of said rectilinear movement.

11. In combination with an optical apparatus for use on a substantially rectilinearly moving body having the line of collimation in the plane of the rectilinear movement, a gyroscope for stabilizing the field of view of said apparatus, means for compensating for the straying of said gyroscope, mechanism for nullifying the effect of the rectilinear movement on the field of view of said apparatus, means for compensating for the drift of said body, and means for measuring the relative speed of said body.

12. An optical apparatus for use on a rectilinearly moving body, comprising an optical instrument, an external optical part in optical relation therewith, a gyroscope, said part being associated with said gyroscope whereby it is stabilized, variable speed mechanism for moving said gyroscope and said part at a speed proportional to the speed of the body so as to immobilize the field of view, means associated with said mechanism for indicating the speed of said body, and means for orienting the collimation line of said apparatus parallel to the rectilinear movement of the body.

13. In an optical apparatus mounted on a relatively angularly and rectilinearly moving body, the combination of a gyroscope for stabilizing the field of view of said apparatus against angular movement, variable speed mechanism for immobilizing the field of view of said apparatus against rectilinear movement, and indicating means associated with said mechanism for designating the speed of said rectilinear movement.

14. In an optical apparatus mounted on a relatively angularly and rectilinearly moving body, the combination of a gyroscope for stabilizing the field of view in the focal plane of the apparatus against angular movement, cam-actuated means for immobilizing the field of view in the focal plane of the apparatus against rectilinear movement, mechanism for orienting said apparatus parallel to the rectilinear movement, and means associated with said mechanism for indicating the direction of the rectilinear movement.

15. In an optical apparatus mounted on a rectilinearly moving body, an external optical part in optical relation with said apparatus, mechanism for moving said part in the plane of and proportional to the rate of the rectilinear movement whereby the object in the field of view of said apparatus is stabilized, and indicating means associated with said mechanism for indicating the distance between the body and the object according to a function of the movement of said optical part.

16. In an optical apparatus, a combination of a movable external reflector for the apparatus, means for immobilizing the field of view of the apparatus, said means comprising mechanism for bodily orienting the apparatus, gyroscopic means for stabilizing said external reflector and means controlled by the gyroscope for adjusting a member in the focal plane of the apparatus in accordance with a lateral movement of the apparatus.

JAMES BLACKLOCK HENDERSON.